United States Patent [19]

Seki

[11] Patent Number: 5,689,813

[45] Date of Patent: Nov. 18, 1997

[54] RADIO APPARATUS CAPABLE OF DETECTING FIELD INTENSITY

[75] Inventor: Kenji Seki, Tokyo, Japan

[73] Assignee: NEC Corporation, Tokyo, Japan

[21] Appl. No.: 447,346

[22] Filed: May 23, 1995

[30] Foreign Application Priority Data

May 24, 1994 [JP] Japan .................................. 6-109284

[51] Int. Cl.[6] .................................................. H04B 17/00
[52] U.S. Cl. ................... 455/67.7; 455/67.4; 455/226.2; 455/226.4; 340/539; 342/125
[58] Field of Search ........................... 455/33.1, 54.1, 455/67.1, 67.6, 67.4, 67.7, 226.1, 226.2, 226.4, 9; 342/118, 458, 125; 340/988, 539, 573; 379/59, 61, 63

[56] References Cited

U.S. PATENT DOCUMENTS 5,193,216  3/1993  Davis .............................. 455/226.2
5,239,648  8/1993  Ishikura .......................... 455/226.4
5,373,548  12/1994  McCarthy ............................ 379/63
5,390,365  2/1995  Enoki et al. ..................... 455/226.4

FOREIGN PATENT DOCUMENTS 57-141148  9/1982  Japan .

*Primary Examiner*—Nguyen T. Vo
*Attorney, Agent, or Firm*—Scully, Scott, Murphy & Presser

[57] ABSTRACT

A radio apparatus has a detector for detecting the electric field intensity of a test signal received from the other radio apparatus. The detector produces a mean value of the field intensity detected at a predetermined interval and outputs the resulting latest field intensity level signal to a memory circuit. Further, the detector sequentially compares the latest field intensity level signal with a plurality of intensity level signals stored in the memory circuit and thereby delivers a decision signal to a display. In response, the display displays a detailed positional relation between the two radio apparatuses.

8 Claims, 5 Drawing Sheets

RADIO APPARATUS CAPABLE OF DETECTING FIELD INTENSITY

BACKGROUND OF THE INVENTION

The present invention relates to a radio apparatus and, more particularly, to a radio apparatus capable of determining whether it can communicate with the other radio apparatus.

It has been a primary issue with a radio apparatus to determine whether or not it can communicate with the other radio apparatus.

In respect to the above mentioned issue, Japanese Patent showa 57-141148, for example, discloses a radio telephone system made up of a master unit and a slave or portable unit. The master unit has a communication control section and a status display. The communication control section generates a call terminating signal when determining whether or not it can communicate with the portable unit (referred to as a communication test hereinafter). The portable unit has a signal control section for generating an answer signal on detecting the call terminating signal.

In the master unit, the communication control section sends the call terminating signal to the portable unit while waiting for a signal from an exchange or a call originating signal from the portable unit. When the portable unit lies in a range communicable with the master unit, the signal control section thereof sends the answer signal to the master unit by detecting the call terminating signal. In the master unit, the communication control section determines whether or not the answer signal has a level lower than a predetermined level. If the level of the answer signal is higher than the predetermined level, the status display of the master unit does not display information indicative of the fact that the portable unit is out of the communicable range.

On the other hand, when the portable unit does not lie in the communicable range, the signal control section thereof cannot detect the call terminating signal and cannot, therefore, return the answer signal to the master unit. In the master unit, when the communication control section does not detect any answer signal within a predetermined period of time after the transmission of the call terminating signal, it causes the status display to show that the portable unit is out of the communicable range.

The above document also teaches that the portable unit sends a call originating signal and displays, based on the level of an answer signal received from the master unit, an out-of-range status.

Although the system described above can determine whether or not the portable unit lies in the communicable range, it cannot detect a detailed positional relation between the portable unit and the master unit.

SUMMARY OF THE INVENTION

It is, therefore, an object of the present invention to provide a radio apparatus capable of detecting a detailed positional relation thereof to the other radio apparatus.

It is another object of the present invention to provide a radio apparatus capable of displaying a detailed relation thereof to the other radio apparatus in accordance with the field intensity or strength of a signal received from the other apparatus.

It is a further object of the present invention to provide a radio apparatus capable of detecting the field intensity of a signal received from the other radio apparatus, and sending the detected field intensity to the other apparatus to allow it to also display a detailed positional relation.

In order to achieve the above objects, a radio apparatus of the present invention has a calculating circuit for detecting the electric field intensity of a signal received from the other radio apparatus to thereby calculate the latest field intensity level, a storage for storing a plurality of predetermined field intensity levels, a comparing circuit for sequentially comparing the latest field intensity level with the predetermined field intensity levels to thereby output a decision signal, and a display for displaying, based on the decision signal, a positional relation between the radio apparatus and the other radio apparatus.

Preferably, the radio apparatus has a transmitter for transmitting the field intensity signal to the other radio apparatus.

The radio apparatus displays a positional relation between it and the other apparatus by comparing the latest intensity level calculated from the field intensity of a test signal received from the other apparatus with the predetermined intensity levels. Hence, the apparatus can display not only whether or not the other apparatus lies in a communicable range, but also a detailed positional relation to the other apparatus.

In addition, when the other apparatus has the same configuration as the apparatus of the invention, the former also can display the detailed positional relation because the latter sends the field intensity signal to the former.

BRIEF DESCRIPTION OF THE DRAWINGS

These and other objects, features and advantages of the invention will become more fully apparent from the following detailed description taken in conjunction with the accompanying drawings in which.

DESCRIPTION OF THE PREFERRED EMBODIMENTS

Figure 1:
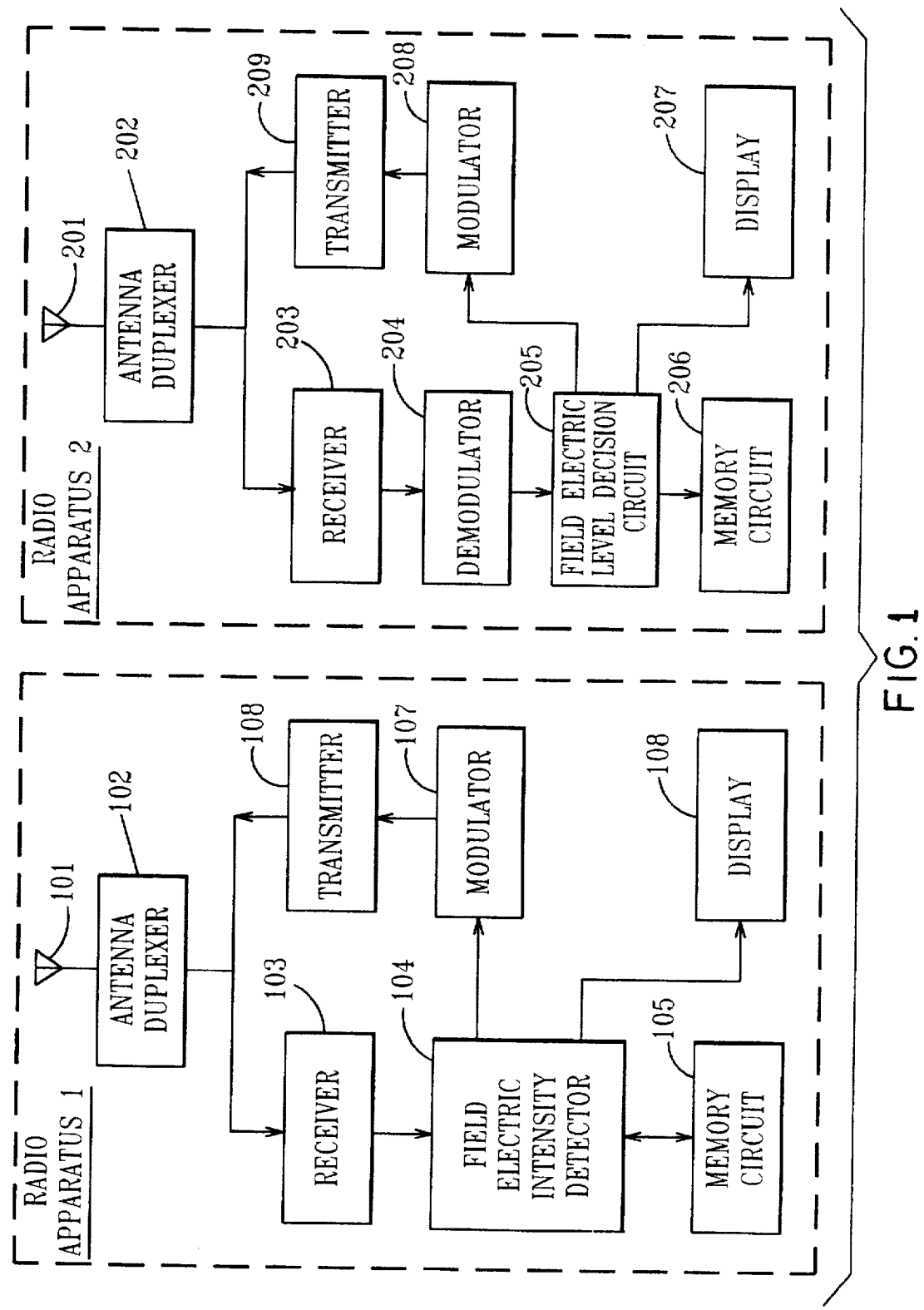
FIG. 1 is a block diagram schematically showing a radio apparatus embodying the present invention and a radio apparatus expected to communicate therewith.

Referring to FIG. 1 of the drawings, a radio apparatus 1 has an antenna 101, and an antenna duplexer 102 connected to the antenna. A receiver 103 amplifies a signal coming in through the antenna 101 and antenna duplexer 102 and delivers the amplified signal to a field electric intensity detector 104.

The intensity detector 104 detects the field intensity or strength of the amplified signal, e.g., the amplitude of the signal and outputs an intensity detection signal to a modulator 107. The intensity detector 104 produces mean values of the intensity detection signal at predetermined intervals while delivering the latest intensity level signal to a memory circuit 105. The intensity detector 104 compares the latest intensity level signal with a plurality of intensity level signals stored in the memory circuit 105 beforehand. A decision signal representative of the result of comparison fed from the intensity detector 104 to a display 106.

The memory circuit 105 stores the latest intensity level signal while storing the intensity level signals written thereto beforehand. The display 106 displays a detailed positional relation between the radio apparatus 1 and a radio apparatus 2 expected to communicate therewith.

A modulator 107 modulates a carrier with the intensity detection signal fed from the intensity detector 104 and delivers the resulting modulated signal to a transmitter 108. The transmitter 108 amplifies the modulated signal and then sends it via the duplexer 102 and antenna 101.

The other radio apparatus 2 has an antenna 201, and an antenna duplexer 202 connected to the antenna 201. A receiver 203 amplifies a received signal from the duplexer 202 and delivers the amplified signal to a demodulator 204. The demodulator 204 demodulates the input signal and outputs the demodulated signal, e.g., intensity detection signal detected by the radio apparatus 1 to a field electric level decision circuit 205.

The decision circuit 205 produces mean values of the intensity detection signal at predetermined intervals and writes the latest intensity level signal in a memory circuit 206. The decision circuit 205 compares the latest intensity level signal with a plurality of intensity level signals stored in the memory circuit 206 beforehand. A decision signal representative of the result of comparison is fed from the decision circuit 205 to a display 207. The decision circuit 205 delivers a test signal also stored in the memory circuit 206 beforehand to a modulator 208 at predetermined intervals.

The memory circuit 205 stores the latest intensity level signal output form the decision circuit 205 while storing the intensity level signals and test signal written thereto beforehand. The display 207 displays a detailed positional relation of the radio apparatus 2 to the radio apparatus 1.

The modulator 208 modulates a carrier with the test signal and outputs the resulting modulated signal to a transmitter 209. The transmitter 209 amplifies the modulated signal and then feeds it to the duplexer 202.

The operation of the radio apparatuses 1 and 2 will be described hereinafter. In the apparatus 2, the decision circuit 205 outputs the test signal to the modulator 208 at predetermined intervals. The modulator 28 modulates a carrier with the test signal and delivers the modulated signal to the transmitter 209. The transmitter 209 amplifies the modulated signal and outputs the amplified modulated signal to the duplexer 202. As a result, the amplified modulated signal is sent to the apparatus 1 via the antenna 201.

In the apparatus 1, the signal from the apparatus 2, coming in through the antenna 101 and duplexer 102, is applied to the receiver 103. The receiver 103 amplifies the received signal and delivers the amplified signal to the field electric intensity detector 104. The intensity detector 104 detects the field intensity of the amplified signal and outputs an intensity detection signal to the modulator 107. At the same time, the intensity detector 104 produces mean values of the intensity detection signal at predetermined intervals and delivers the latest intensity level signal to the memory circuit 105. The intensity detector 104 compares the latest intensity level signal with the intensity level signals stored in the memory circuit 105 beforehand. A decision signal representative of the result of comparison is fed from the intensity detector 104 to the display 106. The display 106 displays a detailed positional relation between of the apparatus 1 to the apparatus 2 on the basis of the decision signal, as will be described specifically later.

The modulator 107 modulates a carrier with the intensity detection signal from the intensity detector 104 and outputs the modulated signal to the transmitter 108. The transmitter 108 amplifies the modulated signal and feeds the amplified signal to the antenna 101. As a result, the amplified signal is sent to the apparatus 2 via the antenna 101.

In the apparatus 2, the signal from the apparatus 1 is received by the antenna 201 and applied to the receiver 203 via the duplexer 202. The receiver 203 amplifies the input signal and outputs the amplified signal to the demodulator 204. The demodulator 204 demodulates the amplified signal and then outputs the demodulated signal to the decision circuit 205. The demodulated signal corresponds to the intensity detection signal detected by the apparatus 1. The decision circuit 205 produces mean values of the intensity detection signal at predetermined intervals while outputting the latest intensity level signal to the memory circuit 206. At the same time, the decision circuit 205 compares the latest intensity level signal with the intensity level signals stored in the memory circuit 206 beforehand and then delivers the resulting decision signal to the display 207. The display 207 displays a detailed positional relation between the apparatuses 2 and 1 on the basis of the decision signal.

Figure 2:
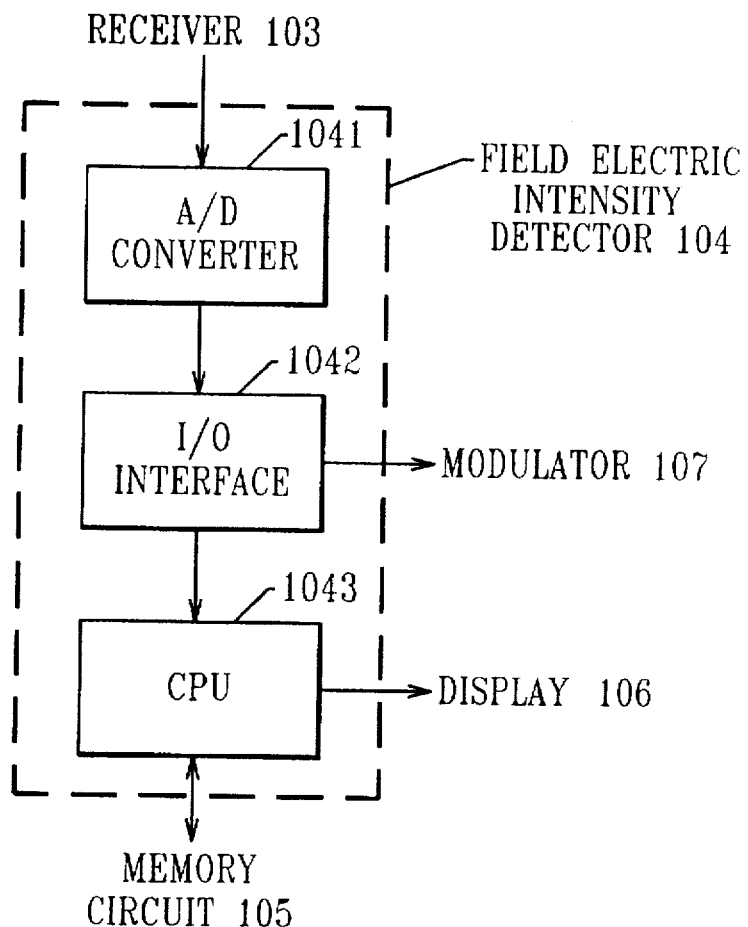
FIG. 2 is a block diagram schematically showing a field electric intensity detector included in the embodiment.

As shown in FIG. 2, the intensity detector 104 of the apparatus 1 is made up of an analog-to-digital (A/D) converter 1041, an input/output (I/O) interface 1042, a microprocessor (referred to as a CPU (Central Processing Unit) hereinafter) 1043. The A/D converter 1041 transforms the amplified received signal from the receiver 103 to a digital signal and delivers the resulting detection signal to the I/O interface 1042. The interface 1042 transfers the intensity detection signal to the modulator 107 and CPU 1043. The CPU 1043 produces mean values of the intensity detection signal at predetermined intervals while writing the latest intensity level signal to the memory circuit 105. Further, the CPU 1043 compares the latest intensity level signal with the intensity level signals stored in the memory circuit 105. A decision signal representative of the result of comparison is fed from the CPU 1043 to the display 106.

Figure 3:
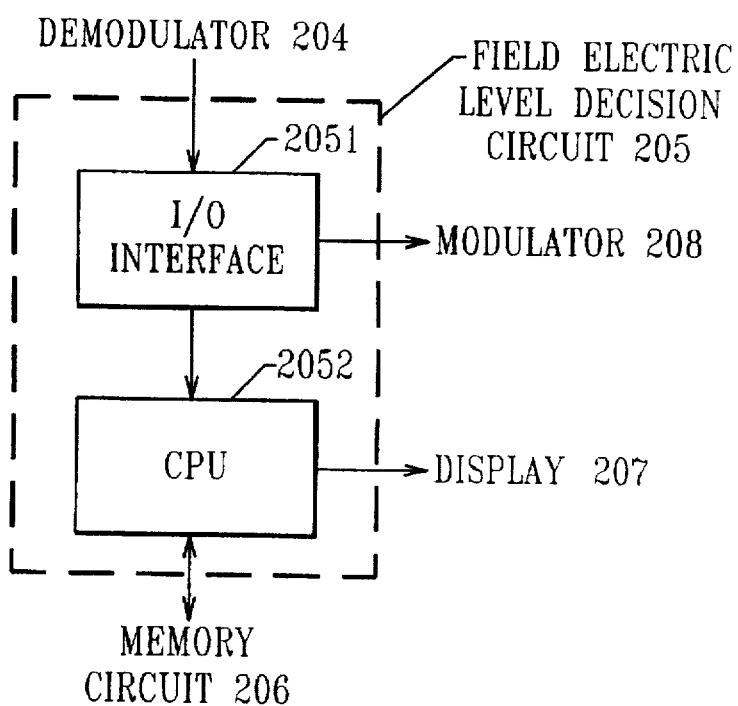
FIG. 3 is a block diagram schematically showing a field electric level decision circuit included in the other radio apparatus.

As shown in FIG. 3, the decision circuit 205 has an I/O interface 2051 and a CPU 2052. The interface 2051 transfers the intensity detection signal fed from the demodulator 204 to the CPU 2052 or transfers the test signal fed from the CPU 2052 to the modulator 208. The CPU 2052 produces mean values of the intensity detection signal at predetermined intervals and outputs the latest intensity level signal to the memory circuit 206. At the same time, the decision circuit 205 compares the latest intensity level signal with the intensity level signals stored in the memory circuit 206 beforehand and then delivers the resulting decision signal to the display 207. Further, the decision circuit 205 outputs the test signal stored in the memory circuit 206 to the modulator 208 at predetermined intervals.

Figure 4:
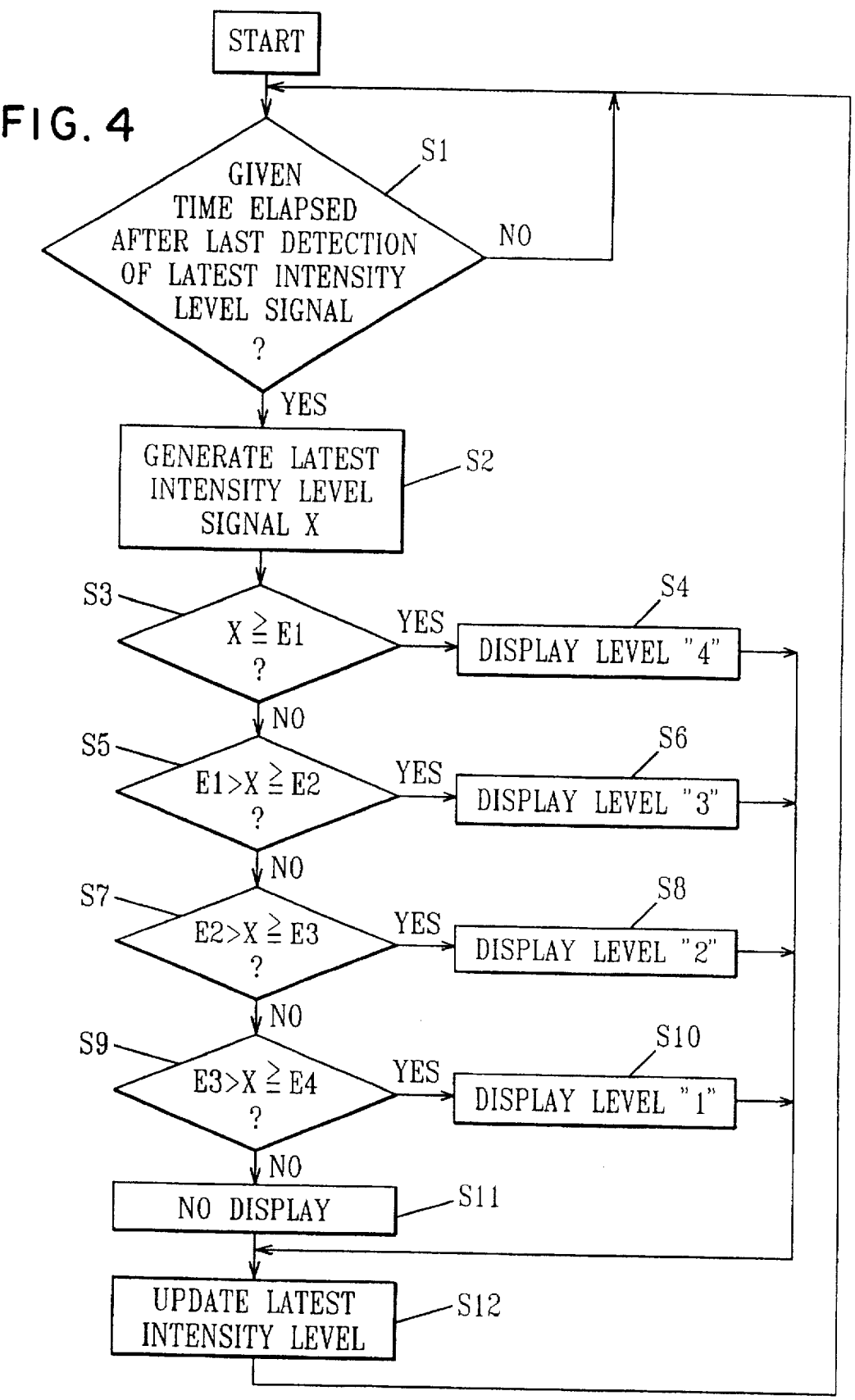
FIG. 4 is a flowchart demonstrating a procedure for determining a field intensity level and executed by a CPU shown in FIG. 2.

How the CPU 1043, FIG. 2, determines the field intensity level will be described with reference to FIG. 4. As shown, on the elapse of a predetermined period of time after the latest intensity level signal has been detected last (step S1), the CPU 1043 produces a mean value of the intensity detection signal input after the calculation of the last latest intensity level signal and thereby generates the latest intensity level signal X (step S2). The CPU 1043 compares the signal X with, among the intensity level signals stored in the memory circuit 105, a signal E1 representative of the greatest value (step S3). If the signal X is greater than or equal to the signal E1 (Yes, step S3), the CPU 1043 displays a level "4" (step S4). If otherwise (No, step S3), the CPU 1043 compares the signal X with another intensity level signal E2 smaller in value than the signal E1 (step S5). If the signal X is greater than or equal to the signal E2 (Yes, step S5), the CPU 1043 displays a level "3" (step S6). If otherwise (No, step S5), the CPU 1043 compares the signal X with still another intensity level signal E3 smaller in value than the signal E2 (step S7). If the signal X is greater than or equal to the signal E3 (Yes, step S7), the CPU 1043 displays a level "2" (step S8). If otherwise (No, step S7), the CPU 1043 compares the signal X with a further intensity level signal E4 smaller in value than the signal E3 (step S9). If the signal X is greater than or equal to the signal E4 (Yes, step S9), the CPU 1043 displays a level "1" (step S10). If otherwise, (No, step S9), the CPU 1043 does not display any level (step S11). After the step S4, S6, S8, S10 or S11, the CPU 1043 updates the signal X generated in the step S2 (step S12) and then returns to the step S1.

Among the intensity level signals E1-E4, the signals E1 and E2 are representative of intensities with which the apparatus 1 can communicate with the apparatus 2. The signal E3 is representative of a threshold which allows the communication to be held. The signal E4 is representative of an intensity almost reaching the communicable range.

Specifically, among the levels 1-4 selectively displayed, the levels "4" and "3" each shows the user of the apparatus that the apparatus 1 can communicate with the apparatus 2. The level "2" shows that the apparatus 1 can communicate with the apparatus 2, but the apparatus 2 is located at the boundary portion of a communicable range. The level "1" shows that the apparatus 1 cannot communicate with the apparatus 2, but the apparatus is located at the boundary portion of the communicable range. When no levels are displayed, the user is informed of the fact that the apparatus 1 cannot communicate with the apparatus 2. This may be replaced with an "out-of-range" display, if desired.

The above procedure informs the user of the positional relation between the apparatuses 1 and 2. For example, when this display changes from the level "3" to the level "2", the user sees that the apparatus 1 or 2 is leaving the communicable range.

The CPU 2052 shown in FIG. 3 operates in the same manner as the CPU 1043.

Figure 5:
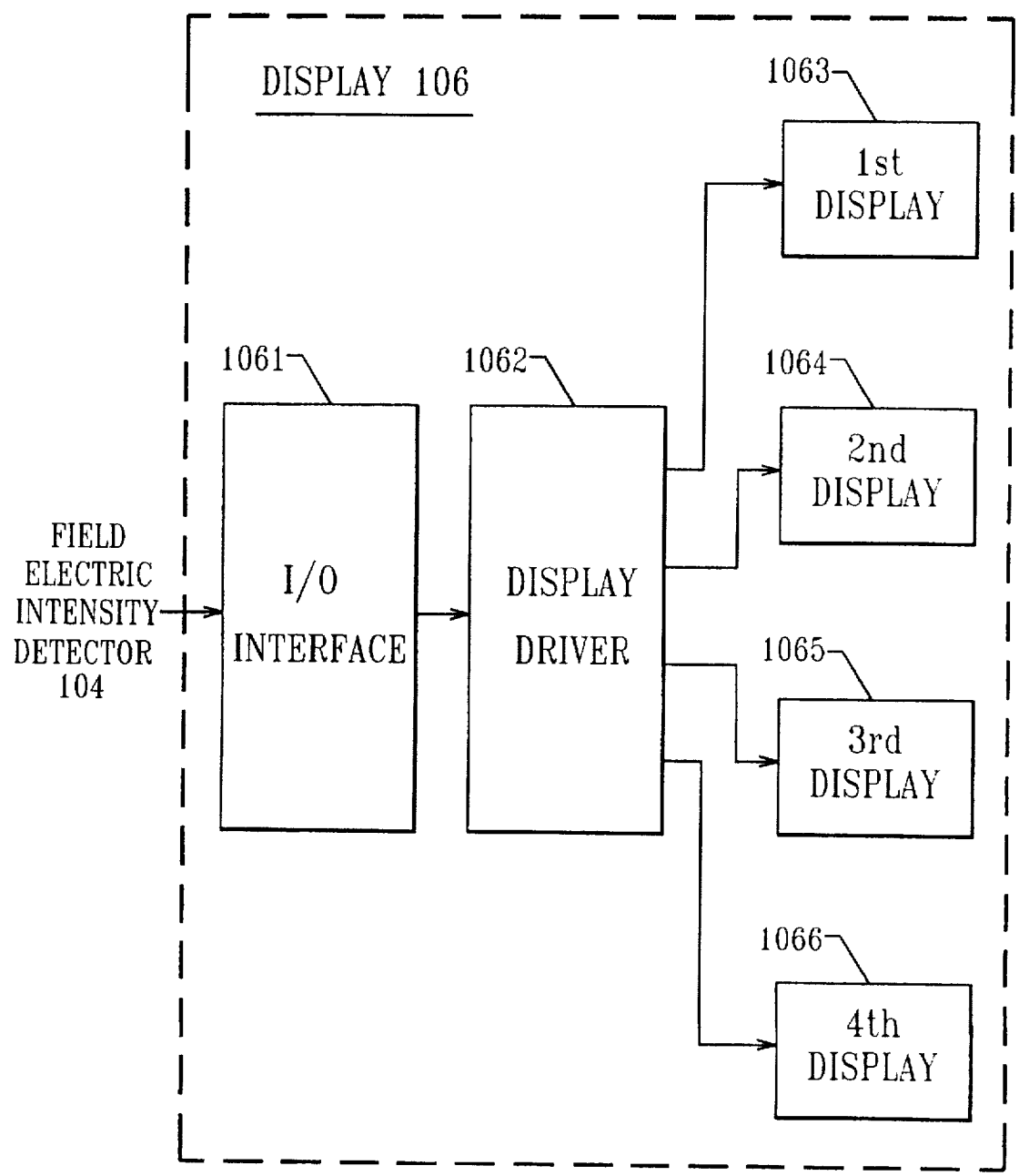
FIG. 5 is a block diagram schematically showing a display included in the embodiment.

As shown in FIG. 5, the display 106 has an I/O interface 1061 for transferring the decision signal fed from the CPU 1043 to a display driver 1062. The display driver 1062 drives one of a first display 1063 to a fourth display 1066 on the basis of the input decision signal. The displays 1063-1066 each displays a particular positional relation between the apparatuses 1 and 2.

The display 206 of the apparatus 2 is configured in the same manner as the display 106.

In the illustrative embodiment, the apparatus 2 sends the test signal at predetermined intervals. Alternatively, a switch may be provided on the apparatus 2 and turned on to send the test signal when it is desired to see the positional relation between the apparatuses 1 and 2. While the test signal has been shown and described as being sent from the apparatus 2 to the apparatus 1, the test signal may also be stored in the memory circuit 105 of the apparatus 1 and sent to the apparatus 2 via a switch provided on the apparatus.

In the embodiment, one of the first to fourth displays 1063-1066 is driven to show a detailed positional relation between the apparatuses 1 and 2. Alternatively, the detailed positional relation may be reported to the user by sound, if desired.

Further, the apparatus 1 may send the latest intensity level signal to the apparatus 2 in place of the intensity detection signal. This makes it needless for the apparatus to send the intensity detection signal continuously.

Figure 6:
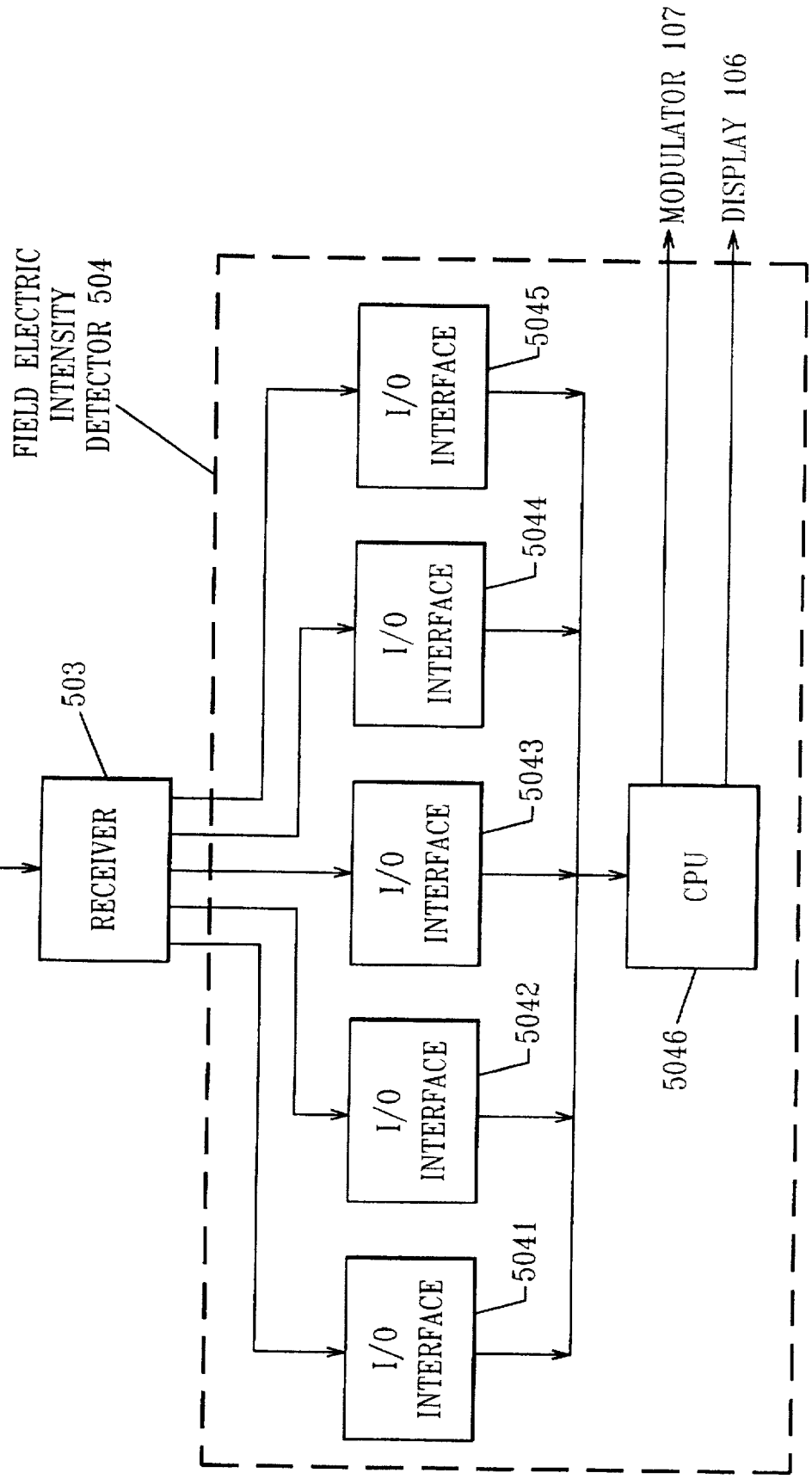
FIG. 6 is a bock diagram schematically showing a receiver and a field electric intensity detector which are representative of an alternative embodiment of the present invention.

Referring to FIG. 6, an alternative embodiment of the present invention will be described. Briefly, a field electric intensity detector 504 included in this embodiment generates a decision signal without resorting to the intensity levels stored in the memory circuit 105. The constituents of the apparatus 1 other than a receiver 503 and the intensity detector 504 are identical in construction and operation with their counterpart of the previous embodiment and will not be described in order to avoid redundancy. In this embodiment, the memory circuit 105 does not store the intensity levels.

The receiver 503 is implemented by an amplifier μPC789G available from NEC Corporation (Japan) and available for an intermediate frequency of 455 kHz. The receiver 503 has five output terminals connected to I/O interfaces 5041-5045, respectively. The receiver 503 amplifies the received signal from the duplexer 102 and outputs the resulting signal to one of the interfaces 5041-5045 via one of the five outputs. The interfaces 5041-5045 each transfers the amplified received signal to a CPU 5046. The CPU 5046 detects an intensity level decision signal from one of the interfaces 5041 and 5045 and delivers it to the display 106 and modulator 107.

The receiver 503 and intensity detector 504 shown in FIG. 6 are operated as follows. The receiver 503 amplifies received signal fed from the duplexer 102 and applies the resulting signal to one of the interfaces 5041-5045. Specifically, the receiver 503 selects one of the five output terminals on the basis of the field intensity, e.g., amplitude of the amplified received signal. More specifically, when the intensity of the amplified signal is higher than the predetermined intensity level E1, the receiver 503 outputs it to the interface 5041. When the intensity of the signal is lower than the level E1 but higher than the intensity level E2, the receiver 503 outputs the amplified signal to the interface 5042. In this manner, the receiver 503 sequentially selects one of the five output terminals on the basis of the intensity of the amplified signal. The CPU 5046, received the amplified signal from the receiver 503, identifies the interface which has output the amplified signal and thereby detects an intensity level decision signal. The decision signal is fed from the CPU 5046 to the modulator 107 and display 106.

In the illustrative embodiment, the CPU 2052 of the apparatus 2 may be operated in the same manner as the CPU 5046 in order to generate a decision signal without using a plurality of intensity levels stored in the memory circuit 105.

Although the apparatuses 1 and 2 have been shown and described as each having a particular configuration, each of them may have a construction relating to the functions of the two apparatuses.

In summary, it will be seen that the present invention provides a radio apparatus capable of displaying a detailed positional relation thereof to the other radio apparatus. This advantage is derived from a unique configuration wherein the apparatus detects the field intensity of a received signal and displays in detail whether or not the apparatus can communicate with the other apparatus.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A radio system comprising:

a first radio apparatus; and a second radio apparatus;

said first radio apparatus comprising:

detecting means for detecting an electric field intensity of a signal received from said second radio apparatus to thereby output a field intensity signal;

first averaging means for calculating a mean value of said field intensity signal at a predetermined interval to thereby output a latest field intensity level signal;

first storing means for storing a plurality of predetermined field intensity level signals;

first comparing means for sequentially comparing said latest field intensity level signal with said plurality of field intensity level signals to thereby output a decision signal representative of a result of comparison;

first displaying means for displaying, based on said decision signal, a positional relation between said first and second radio apparatuses; and first transmitting means for transmitting said field intensity signal to said second radio apparatus;

said second radio apparatus comprising:

second averaging means for calculating a mean value of said field intensity signal from said first radio apparatus at a predetermined interval to output said latest field intensity level signal;

second storing means for storing a plurality of predetermined field intensity level signals;

second comparing means for sequentially comparing said latest field intensity level signal with said plurality of field intensity level signals stored in said second storing means to thereby output a decision signal outputted from said second comparing means representative of a result of comparison;

second displaying means for displaying, based on said decision signal, a positional relation between said first and second radio apparatuses; and second transmitting means for transmitting said signal to said first radio apparatus.

2. A system as claimed in claim 1, wherein said second storing means stores, when said second averaging means produces said latest field intensity level signal, said latest field intensity level signal.

3. A system as claimed in claim 1, wherein said second displaying means changes a display in accordance with a distance between said first and second radio apparatuses.

4. A system as claimed in claim 1, wherein said second comparing means changes a display of said second displaying means in accordance with a field intensity represented by said latest field intensity level signal outputted from said second averaging means.

5. A system as claimed in claim 1, wherein said second transmitting means further comprises:

test signal generating means for generating, as said signal from said second radio apparatus, a test signal for detecting a positional relation between said first and second radio apparatuses.

6. A method of displaying a positional relation between a first radio apparatus and a second radio apparatus, said method comprising the steps of:

transmitting a signal from said second radio apparatus to said first radio apparatus;

detecting an electric field intensity of said signal at said first radio apparatus to thereby output a field intensity detection signal;

calculating at said first radio apparatus a mean value of said field intensity detection signal at a predetermined interval to thereby output a latest field intensity level signal;

comparing at said first radio apparatus said latest field intensity level signal with a plurality of predetermined field intensity level signals to thereby output a decision signal representative of a result of comparison;

displaying, based on said decision signal, a positional relation between said first and second radio apparatuses at said first radio apparatus;

transmitting said field intensity detection signal from said first radio apparatus to said second radio apparatus;

calculating at said second radio apparatus a mean value of said field intensity detection signal at a predetermined interval to thereby output said latest field intensity level signal;

comparing at said second radio apparatus said latest field intensity level signal with said plurality of field intensity level signals stored in said second radio apparatus to thereby output a decision signal representative of a result of comparison; and displaying a positional relation between said first and second radio apparatuses at said second radio apparatus.

7. A method as claimed in claim 6, further comprising the step of storing said latest field intensity level signal in said second radio apparatus when said second radio apparatus calculates said latest field intensity level signal.

8. A method as claimed in claim 6, further comprising the step of transmitting, as said signal, a test signal for detecting the positional relation from said second radio apparatus to said first radio apparatus.

* * * * *